United States Patent [19]

Matsukawa

[11] Patent Number: 5,585,878
[45] Date of Patent: Dec. 17, 1996

[54] INFORMATION SETTING DEVICE FOR A CAMERA

[75] Inventor: Nobuo Matsukawa, Tokyo, Japan

[73] Assignee: Nikon Corporation, Tokyo, Japan

[21] Appl. No.: 273,926

[22] Filed: Jul. 12, 1994

[30] Foreign Application Priority Data

Jul. 13, 1993 [JP] Japan .................. 5-173379

[51] Int. Cl.⁶ .................................. G03B 17/00
[52] U.S. Cl. ............................. 396/281; 396/297
[58] Field of Search .................. 354/289.1, 289.12

[56] References Cited

U.S. PATENT DOCUMENTS

| | | | |
|---|---|---|---|
| 4,538,891 | 8/1984 | Matsayama et al. | 354/289.1 |
| 4,687,308 | 8/1987 | Someya | 354/82 |
| 5,291,236 | 3/1994 | Ohsawa et al. | |

*Primary Examiner*—Michael L. Gellner
*Assistant Examiner*—Daniel Chapik
*Attorney, Agent, or Firm*—Oliff & Berridge

[57] ABSTRACT

The present invention is applicable to an information setting device for a camera which is capable of switching over several information setting operation members between validity and invalidity for setting control information, and which also contributes to greater compactness of the camera. It includes information setting operation members which are operated for setting control information; an information setting means which sets the control information according to the operation of the information setting operation members; a switchover operation member group which is operated for switching each of the control information setting functions of the information setting operation members between a valid state and an invalid state; and a switchover control means which switches over each of the control information setting functions between the valid state and the invalid state respectively according to the operation of the switchover operation member group. The switchover operation member group includes a common operation member which is operated in common for switching over any one of the above functions of the information setting operation members.

46 Claims, 16 Drawing Sheets

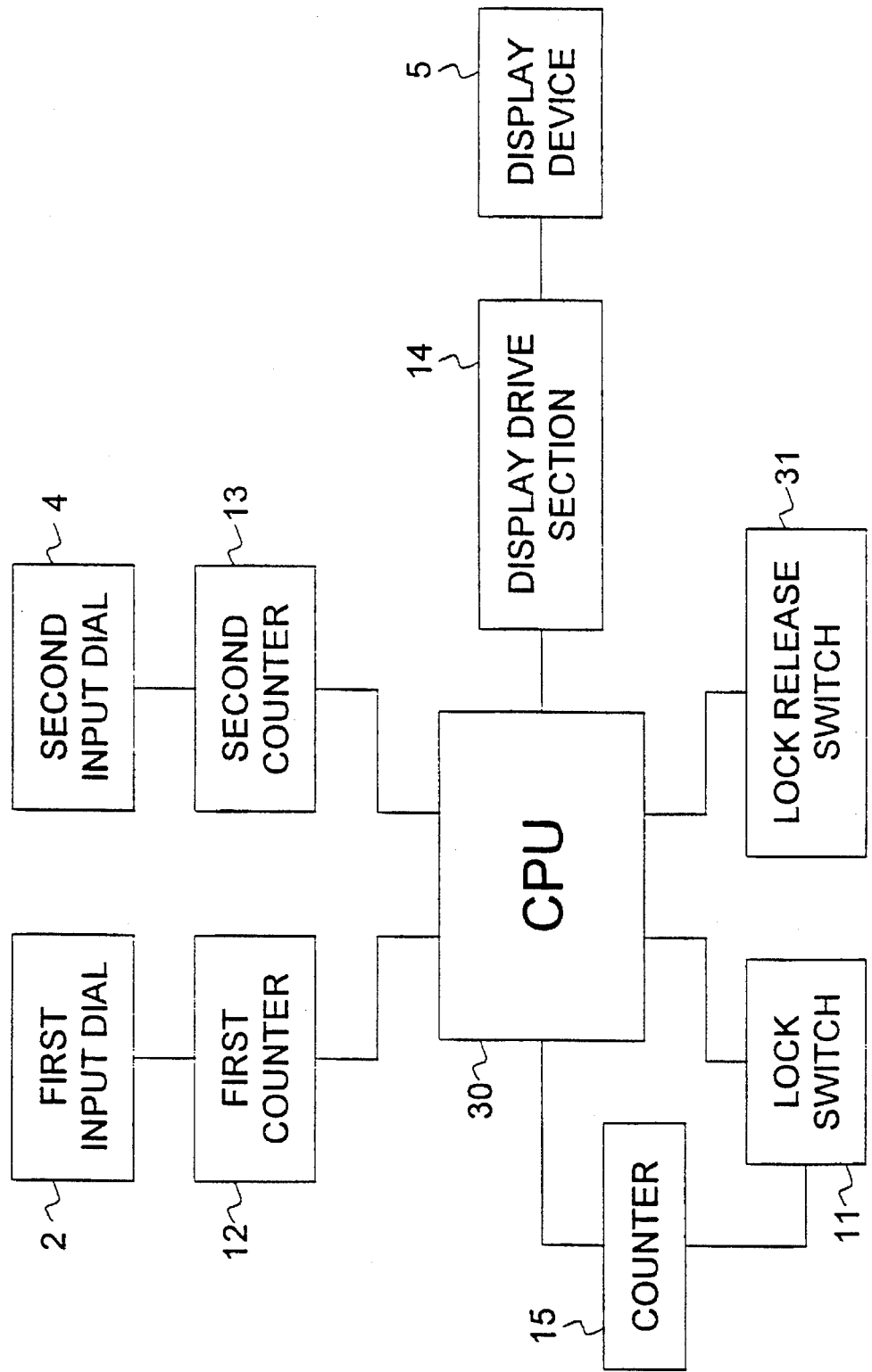

FIG.IOA
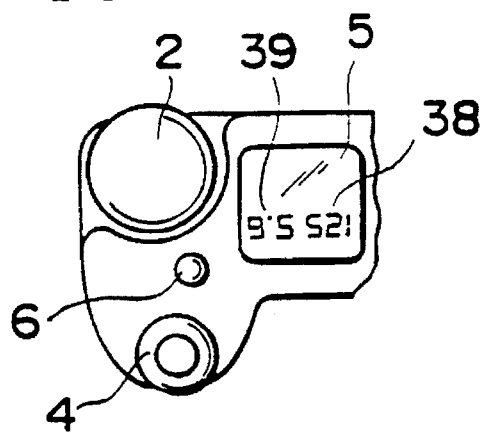
FIG.IOB
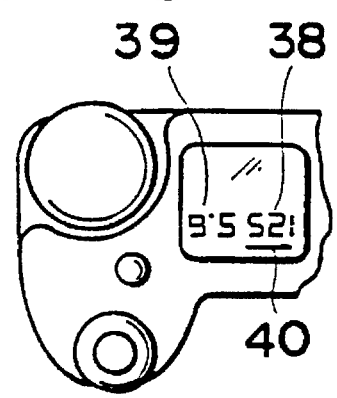
FIG.IOC
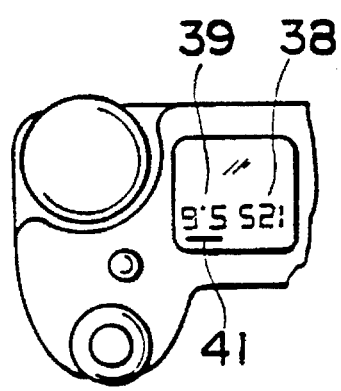
FIG.IOD
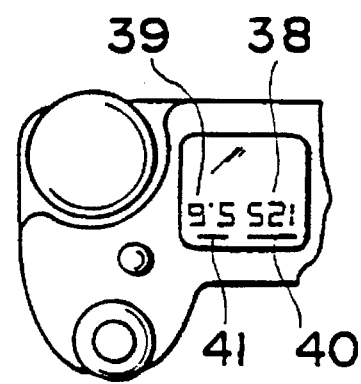

INFORMATION SETTING DEVICE FOR A CAMERA

BACKGROUND OF THE INVENTION

1. Field of the Invention

The present invention relates to an information setting device for a camera, in which control information such as shutter speed or aperture value etc. is set in accordance with the operation of an information setting operation member such as an electronic dial or the like.

2. Description of the Related Art

An information setting device for a camera is per se known, which is provided with an information setting operation member such as a rotatable electronic dial which generates a pulse signal according to the amount by which it is rotated (hereinafter simply referred to as an electronic dial); and various sorts of control information such as shutter speed or aperture value or the like are set according to the pulse signal from this electronic dial. Since with this sort of device the pulse signal from the electronic dial is transmitted electrically to a control device, in contrast with the mechanical type of dial in which the movement of some information setting operation member is transmitted mechanically via a cam or a linkage or the like, thereby the position of the electronic dial can be chosen with great freedom. Further, because the amount of force necessary to operate such an electronic dial is small, it is possible for the system to present a light and easy operational feel to the user. On the other hand, since the force required for the operation is so small, even brushing of the clothes or the like of the user against the electronic dial may cause it to be rotated, and therefore, if the user does not exercise sufficient care, there is a possibility that the setting state for the information may be inadvertently altered.

To overcome this problem, as disclosed for example in U.S. Pat. No. 5,291,236, there has been proposed the addition of an operation inhibition lock switch to such an electronic dial, with this lock switch being switchable between valid and invalid positions, so as respectively to enable or disable the information setting operation of the electronic dial. When such a lock switch is turned to its invalid position, the setting state of the information is not altered even if the electronic dial is moved. FIG. 13 shows an example of this type of prior art. In this figure the reference numeral 51 denotes the electronic dial, while 52 is a lock switch member. When the lock switch member 52 is shifted to its position denoted by "L", the input of information via the electronic dial 51 is prevented by electrical means, not particularly shown. Hereinafter in this specification, the state in which control information cannot be altered even though an information setting operation member such as the electronic dial described above is operated will be termed invalid state, while the state in which control information can be altered will be termed valid state.

When various types of control information are to be set for the camera by the use of such devices as described above, it is desirable for a separate electronic dial to be provided for each of the items of control information which need to be frequently changed, such as shutter speed and aperture value. However, if several electronic dials are provided, the provision of a lock switch of the type described above for each of these several electronic dials means that the number of control members is undesirably increased, and it becomes difficult to keep the design of the camera compact. Further if, from the situation in which all of the electronic dials are in their invalid states, all at once it becomes necessary immediately to put all of these dials into their valid states in order to establish a group of new control settings, it is necessary for the user to operate all of the plurality of lock switches in rapid succession, which is complex and troublesome.

SUMMARY OF THE INVENTION

The objective of the present invention is to provide an information setting device for a camera, by the use of which the photographer is enabled to change over each of a plurality of control information setting operation members of the camera between its valid and invalid states, and which nevertheless allows for the design of the camera to be kept compact.

In order to attain this objective, the present invention proposes an information setting device for a camera, comprising: information setting operation members which are operated for setting control information; an information setting means which sets the control information according to the operation of the information setting operation members; a switchover operation member group which is operated for switching each of control information setting functions of the information setting operation members between a valid state and an invalid state respectively; and a switchover control means which switches over each of the control information setting functions between the valid state and the invalid state respectively according to the operation of the switchover operation member group; wherein the switchover operation member group comprises a common operation member which is operated in common for switching over any one of the control information setting functions between the valid state and the invalid state.

BRIEF DESCRIPTION OF THE DRAWINGS

FIG. 7 is a block diagram of a control system of this camera;

FIGS. 10A through 10D are views from above of a camera which incorporates the third embodiment of the information setting device of the present invention in various operational conditions thereof, showing certain indications on a display thereof;

DETAILED DESCRIPTION OF THE PREFERRED EMBODIMENTS

First Embodiment

The first embodiment of the present invention will now be explained with reference to FIGS. 1 through 4.

Figure 1A:
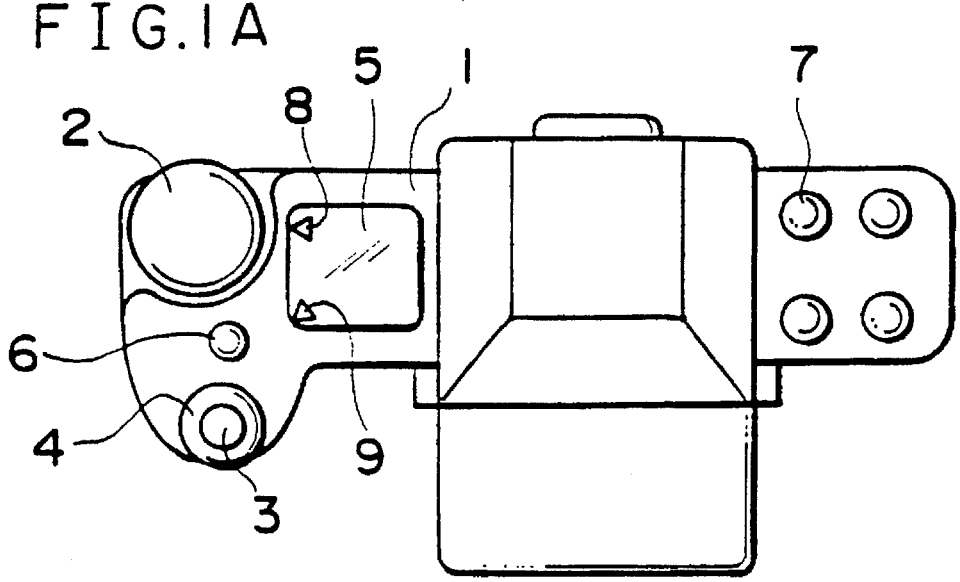
FIG. 1A is a view from above of a camera which incorporates the first embodiment of the information setting device of the present invention.
Figure 1B:
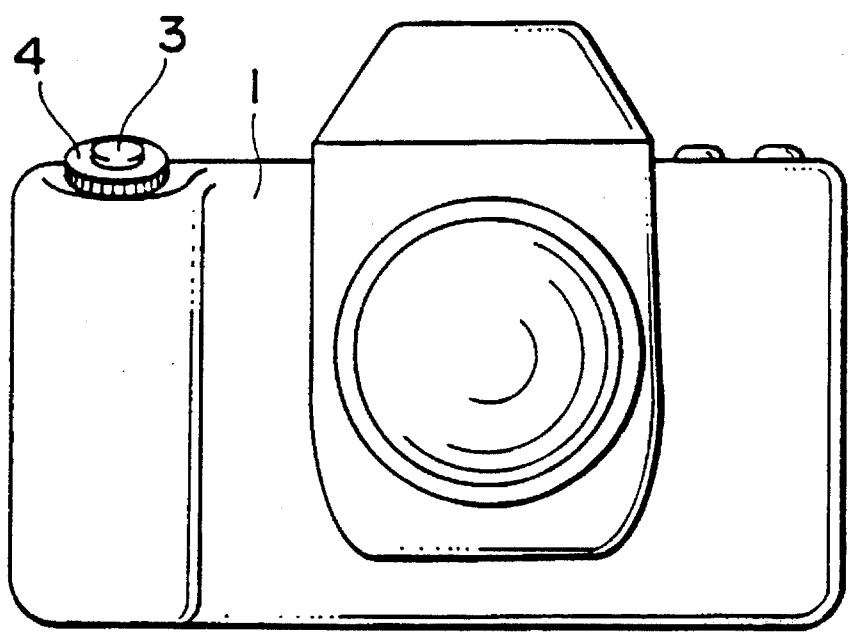
FIG. 1B is a front view of the camera of FIG. 1A.

FIGS. 1 and 2 are respectively a view from above and a view from the front of a camera which incorporates the first embodiment of the information setting device of the present invention, and in these figures the reference numeral 1 denotes the body of the camera, while 2 is a first input dial which can be operated by being manually rotated, 3 is a shutter release button of the camera, and 4 is a second input dial which can be operated by being manually rotated. Each of the first input dial 2 and the second input dial 4 incorporates a pulse signal generator which outputs a pulse every time that the input dial is operated by being rotated through a predetermined angle. 5 is a display device which may be an LCD display or the like, 6 is a lock button which can be operated to switch over the first input dial 2 and the second input dial 4 between the valid state and the invalid state for setting control information, and 7 is a function selection button. On the display device 5 there are displayed the current validity or invalidity of the first input dial 2 and the second input dial 4 for setting control information, and the currently set states of various control information items for the camera such as shutter speed or aperture value or the like (although, in the interests of clarity, such displays are not shown in FIGS. 1 and 2A through 2D). In the following explanation the first input dial 2 and the second input dial 4 will be simply referred to as the input dial 2 or 4 respectively, when it is not necessary to particularize them further.

In the state in which the first input dial 2 is valid for setting control information, when the first input dial 2 is rotated, the setting for shutter speed is altered according to the amount of the rotation of the first input dial 2. And in that state, when the first input dial 2 is rotated while the function selection button 7 is being depressed, the setting of the control information (for example, exposure compensation amount) selected by the function selection button 7 is altered. In the state in which the second input dial 4 is valid for setting control information, when the second input dial 4 is rotated, the setting for aperture value is altered according to the amount of the rotation of the second input dial 4. When the first input dial 2 is invalid for setting control information, the display device 5 displays an indication 8, and, at times when the second input dial 4 is invalid for setting control information, the display device 5 displays an indication 9. In the exemplary embodiment shown, the indications 8 and 9 are triangular marks.

Figure 2A:
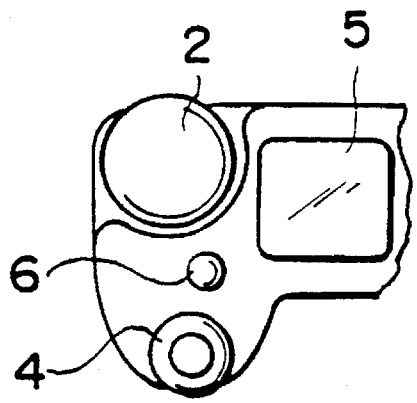
FIGS. 2A through 2D are views from above of this camera in various operational conditions thereof, showing certain indications on a display thereof.
Figure 2B:
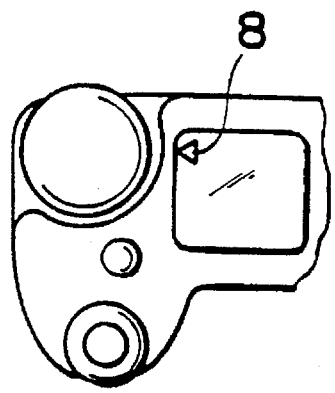
Figure 2C:
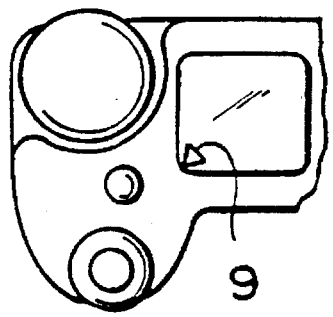
Figure 2D:
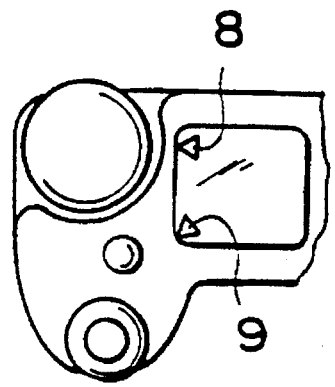

In this first embodiment of the present invention, any one of the following four modes can be selected, according to the number of times that the lock button 6 is operated by being depressed: a both dials valid mode, a first dial invalid mode, a second dial invalid mode, and a both dials invalid mode. In the both dials valid mode, both the first input dial 2 and also the second input dial 4 are valid for setting control information. In the first dial invalid mode, the first input dial 2 is invalid for setting control information, while the second input dial 4 is valid for setting control information. In the second dial invalid mode, the first input dial 2 is valid for setting control information, while the second input dial 4 is invalid for setting control information. And, in the both dials invalid mode, both the first input dial 2 and the second input dial 4 are invalid for setting control information. FIGS. 2A through 2D are views from above of this camera, particularly showing the display of the indications 8 and 9 on the display device 5. In the both dials valid mode, as shown in FIG. 2A, neither the indication 8 nor the indication 9 is displayed on the display device 5. In the first dial invalid mode, as shown in FIG. 2B, the indication 8 is displayed, while the indication 9 is not displayed. In the second dial invalid mode, as shown in FIG. 2C, the indication 8 is not displayed while the indication 9 is displayed. And, in the both dials invalid mode, as shown in FIG. 2D, both the indication 8 and the indication 9 are displayed. In FIGS. 2A through 2D, indications other than the indications 8 and 9 which may be displayed on the display device 5 are not illustrated; actually, it is desirable for the currently set states of various control information items for the camera such as shutter speed or aperture value or the like to be displayed on the display device 5.

Figure 3:
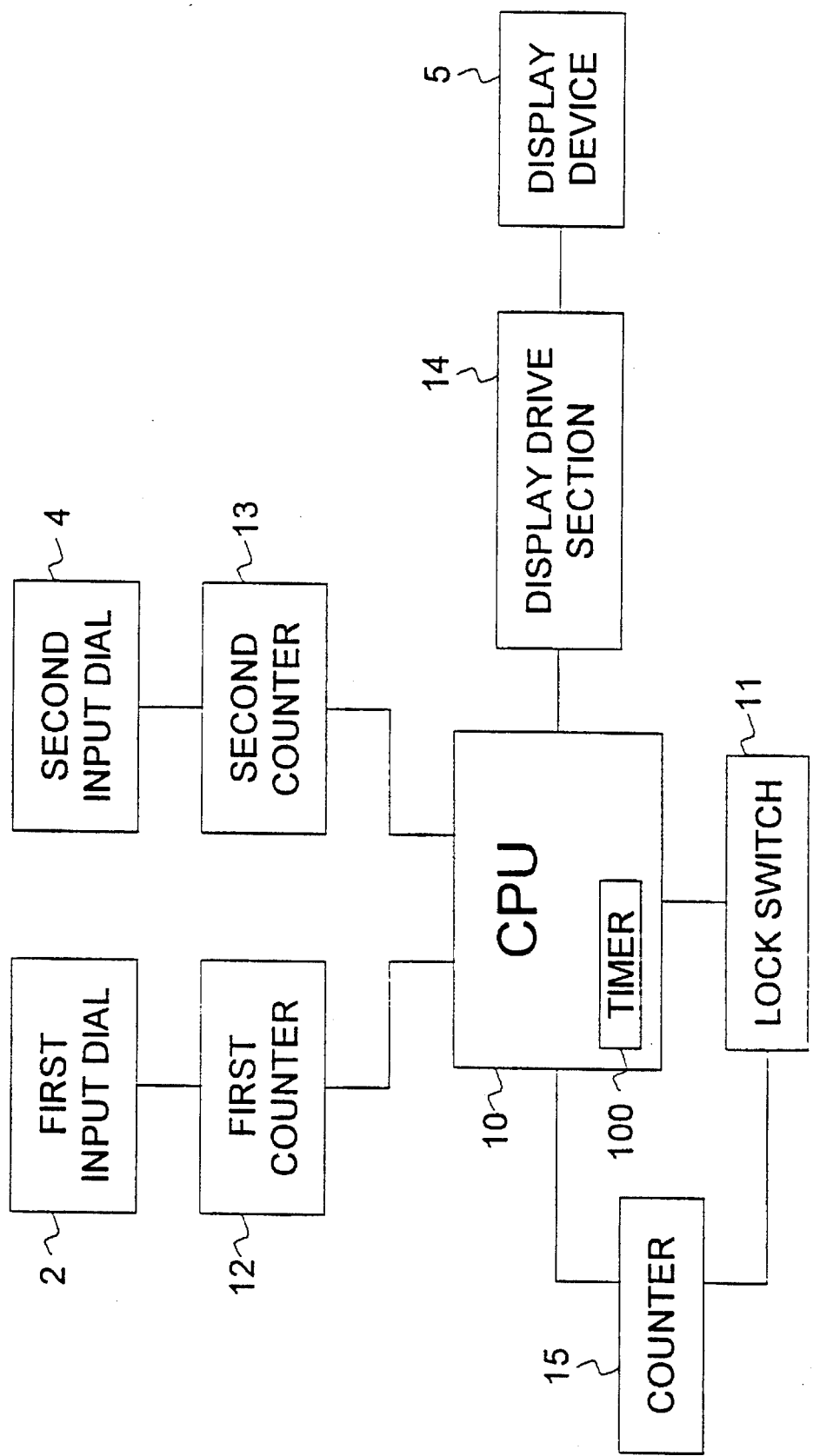
FIG. 3 is a block diagram of a control system of this camera.

FIG. 3 is a block diagram of a control system incorporated in this camera, particularly showing portions thereof related to the switchover control of the input dials 2 and 4 between validity and invalidity for setting control information. Referring to this figure, the reference numeral 10 denotes a CPU (central processing unit) comprising a microcomputer and various associated circuitry essential to the operation thereof, which controls the operation of various parts of the camera. To this CPU 10 there are connected a lock switch 11 which is turned ON when the lock button 6 of FIG. 1A is depressed, a first counter 12 which counts the number of pulses in the pulse signal from the first input dial 2, a second counter 13 which counts the number of pulses in the pulse signal from the second input dial 4, and a display drive section 14 which drives the display device 5 according to a control signal which outputs from the CPU 10. Further, various photographic control devices which are not shown are connected to the CPU 10 as output devices and are actuated thereby, whereby various corresponding parameters related to photography, such as shutter speed and aperture value and the like, are controlled and altered. The CPU 10 changes the setting states of these photographic control devices according to the number of pulses counted by the first counter 12 and the second counter 13. A counter 15 is also connected to the CPU 10, and counts the number of times the lock switch 11 is turned ON. This counter 15 is a two bit counter. When the power supply for the camera is turned ON, this counter 15 is reset to "00", and, each time the lock switch 11 is turned ON, the counter 15 is incremented by unity. After the value "11", counting starts again from "00".

Figure 4A:
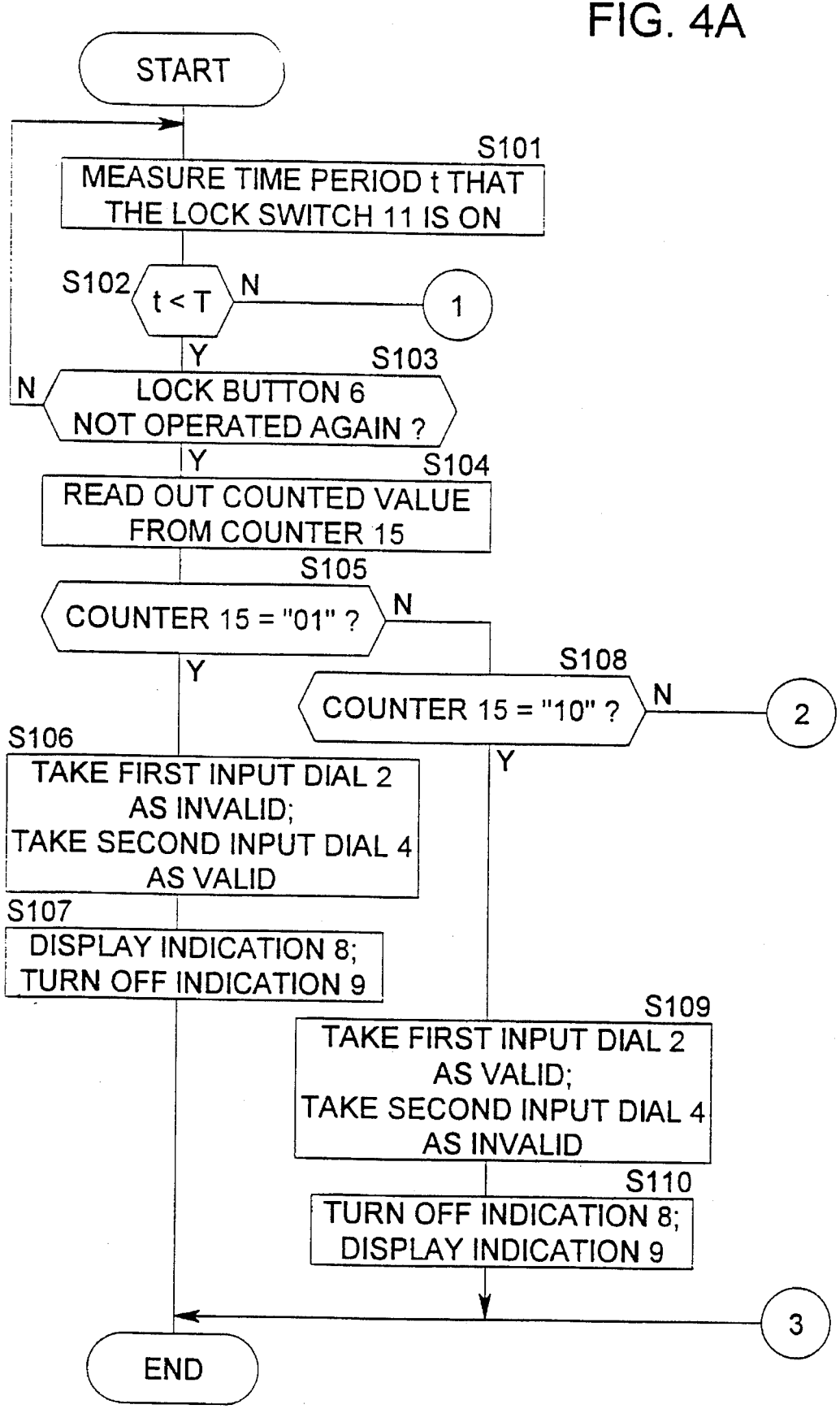
FIG. 4A and FIG. 4B are flow charts showing the operation of a control program executed by a CPU shown in FIG. 3 for switching over information setting operation members between the valid state and the invalid state, according to this first embodiment.
Figure 4B:
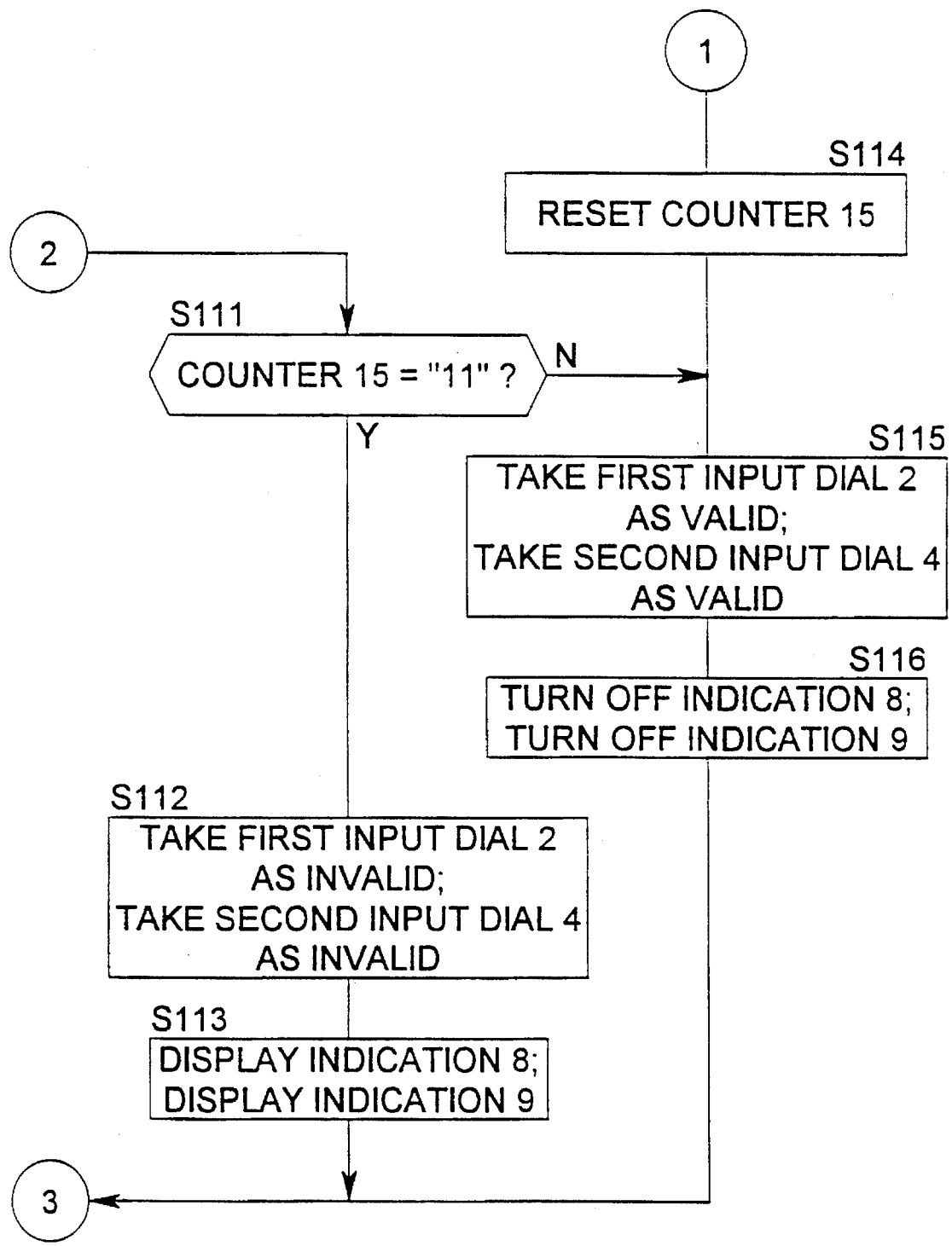

FIGS. 4A and 4B are flow charts showing the operation of a control program executed by the CPU 10 for switching over the first input dial 2 and the second input dial 4 between the valid state and the invalid state for inputting control information. When the lock switch 11 is turned ON by the lock button 6 being depressed, an interrupt is generated which causes the operation of the CPU 10 in performing some other process to be temporarily suspended at this time point, and the CPU 10 instead starts to execute the interrupt service routine whose flow charts are shown in FIGS. 4A and 4B.

First, in the step S101, the time period t that the lock switch 11 is ON (the time period from when it is first turned ON till it is turned OFF) is measured by an internal timer 100. When the lock switch 11 is turned OFF the flow of control advances to the step S102. In the step S102, a decision is made as to whether or not this ON time period t is less than a predetermined time period T, which may for example be 2 or 3 seconds. If the result of this decision is YES the flow of control proceeds to the step S103, while if the result is NO the flow of control jumps to the step S114 of FIG. 4B, in which the counter 15 is reset to "00", and then continues to the step S115.

In the step S103 a decision is made as to whether or not the lock button 6 is depressed again within a predetermined time period, according as to whether or not another ON signal is received from the lock switch 11. If it is decided that the lock button 6 has not been depressed again, the flow of control proceeds to the step S104, while if the lock button 6 has been depressed again the flow of control returns to the step S101. And the counted value in the counter 15 is incremented by unity, each time that the lock button 6 is again depressed and the lock switch 11 is thereby turned ON so that the sequence of steps S101 through S103 is repeated.

In the step S104 the value in the counter 15 is read out. In the step S105 a decision is made as to whether or not the value in the counter 15 is "01", and if the result is YES then this means that the first dial invalid mode is being ordered, and the flow of control is transferred to the step S106. In this step S106, the first input dial 2 is hereafter treated as invalid, while the second input dial 4 is hereafter treated as valid. After this, the flow of control passes to the step S107, in which the indication 8 on the display device 5 is displayed while the indication 9 is not displayed, as shown in FIG. 2B. And then the execution of this interrupt service routine terminates.

If on the other hand in the step S105 the result of the decision is that the value in the counter 15 is not "01", then the flow of control is transferred to the step S108. In this step S108 a decision is made as to whether or not the value in the counter 15 is "10", and if the result is YES then this means that the second dial invalid mode is being ordered, and the flow of control is transferred to the step S109. In this step S109, the first input dial 2 is hereafter treated as valid, while the second input dial 4 is hereafter treated as invalid. After this, the flow of control passes to the step S110, in which the indication 8 on the display device 5 is not displayed while the indication 9 is displayed, as shown in FIG. 2C. And then the execution of this interrupt service routine terminates.

If on the other hand in the step S108 the result of the decision is that the value in the counter 15 is not "10", then the flow of control is transferred to the step S111. In this step S111 a decision is made as to whether or not the value in the counter 15 is "11", and if the result is YES then this means that the both dials invalid mode is being ordered, and the flow of control is transferred to the step S112. In this step S112, both the first input dial 2 and also the second input dial 4 are hereafter treated as invalid. After this, the flow of control passes to the step S113, in which both the indication 8 and also the indication 9 on the display device 5 are displayed, as shown in FIG. 2D. And then the execution of this interrupt service routine terminates.

If on the other hand in the step S111 the result of the decision is that the value in the counter 15 is not "11", then this means that the both dials valid mode is being ordered, and the flow of control is transferred to the step S115. In this step S115, both the first input dial 2 and also the second input dial 4 are hereafter treated as valid. After this, the flow of control passes to the step S116, in which both the indication 8 and also the indication 9 on the display device 5 are not displayed, as shown in FIG. 2A. And then the execution of this interrupt service routine terminates.

During the above described processing, the invalid state of the first input dial 2 is effected by preventing the counting operation of the first counter 12 in correspondence with an appropriate signal being sent thereto from the CPU 10; and, similarly, the invalid state of the second input dial 4 is effected by preventing the counting operation of the second counter 13, for example. By doing this, the counted value or values on those of the counters 12 and 13 which correspond to whichever of the first and second input dials 2 and 4 is or are being treated as invalid is kept constant, whether or not that input dial or dials is actually disturbed by being rotated, so that inadvertent change in the setting of the item or items of control information corresponding to the invalid dial or dials is impossible.

As will be clear from the above explanation, with the shown first embodiment of the present invention as described above, when the lock button 6 is operated by being depressed once or several times (each time for a period shorter than the predetermined time period T), the setting state for validity and invalidity for the first and second input dials 2 and 4 is changed over to a new mode (according to the counted value on the counter 15) cyclically in the following order: the first dial invalid mode, the second dial invalid mode, the both dials invalid mode, and the both dials valid mode. Accordingly, by the use of a single lock button 6, it is possible to switch over the setting states for validity and invalidity for both the first and second input dials 2 and 4 as desired. Therefore, since it is not necessary to provide two separate lock buttons for the two input dials 2 and 4, the compactness of design of the camera is enhanced.

If the lock button 6 is continuously depressed for longer than the predetermined time period T, the result of the decision in the step S102 of FIG. 4A is NO, the both dials valid mode is forcibly selected by the operation in the step S115 of FIG. 4B. Because of this feature, the camera user is always able to perform changeover to the both dials valid mode very easily and quickly, and there is no substantial risk that the photographer will be confused, even when it is necessary to change over to the both dials valid mode immediately. Further, since the current setting states for validity and invalidity of both the first and second input dials 2 and 4 are displayed on the display device 5, these current setting states can both be checked visually. Referring to the terms of the claims, in this first embodiment of the present invention, the lock button 6 serves both as a switchover operation member and as a common control member.

Second Embodiment

The second embodiment of the present invention will now be explained with reference to FIGS. 5 through 9. In the interests of brevity, portions of this second embodiment which are the same as portions of the first embodiment described above will be referred to by the same reference numerals, and will not be particularly explained.

Figure 5A:
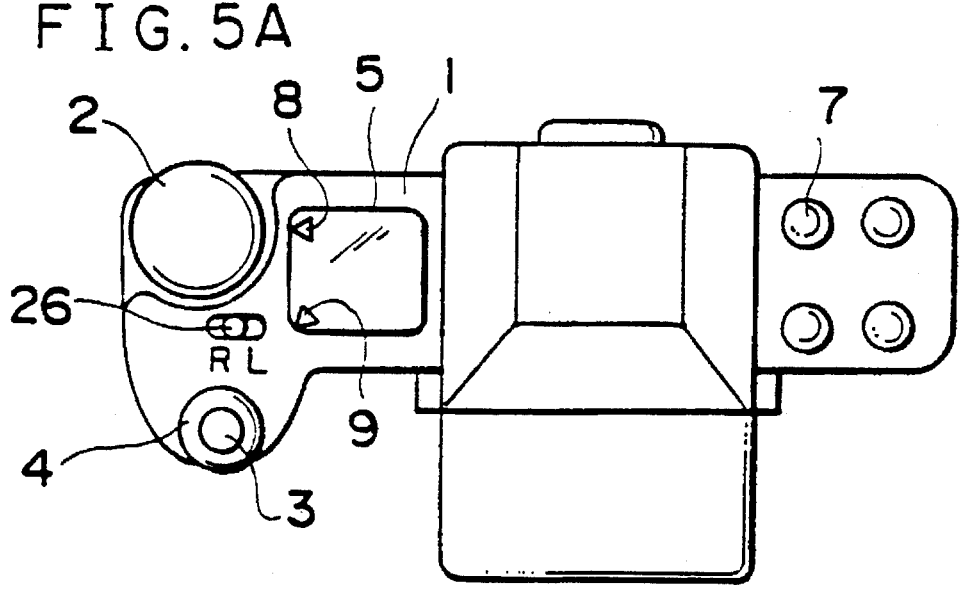
FIG. 5A is a view from above of a camera which incorporates the second embodiment of the information setting device of the present invention.
Figure 5B:
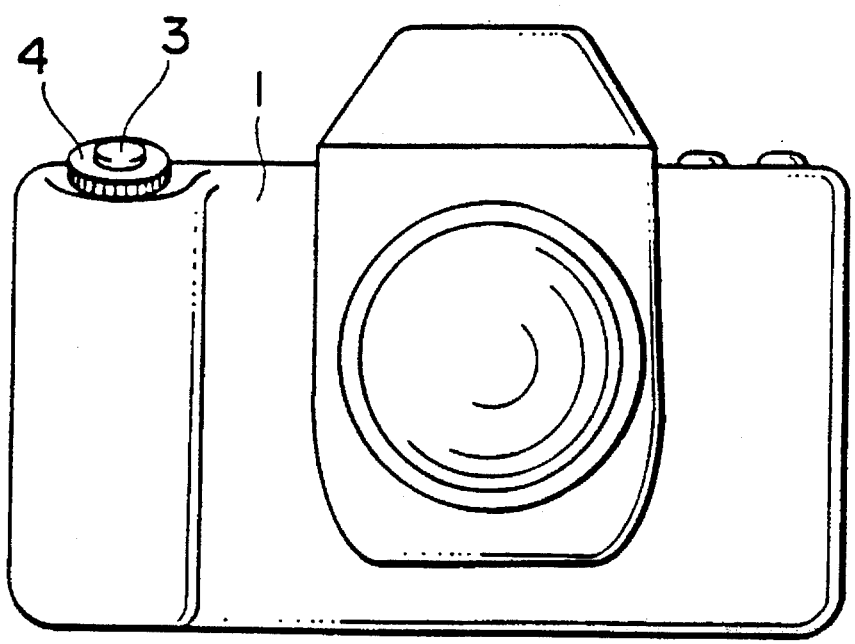
FIG. 5B is a front view of the camera of FIG. 5A.

The camera incorporating this second embodiment is shown in FIGS. 5A and 5B. In this embodiment a lock switch member 26 is provided, instead of the lock button 6 of the first embodiment. This lock switch member 26 can be moved from its intermediate position as shown in FIG. 5A either to a leftwards position "L" or to a rightwards position "R" by being manually slid by the user. When, after thus sliding the lock switch member 26 either to its leftward position "L" or to its rightward position "R", the user then removes his hand from the lock switch member 26 and releases it, a biasing member not shown in the figures (for instance a spring member) returns the lock switch member 26 to its central position between its leftward position "L" and its rightward position "R".

Figure 6A:
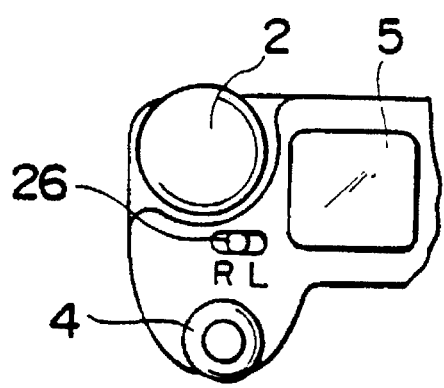
FIGS. 6A through 6D are views from above of this camera in various operational conditions thereof, showing certain indications on a display thereof.
Figure 6B:
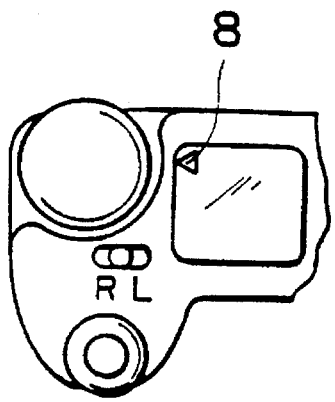
Figure 6C:
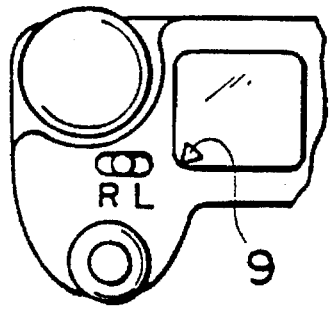
Figure 6D:
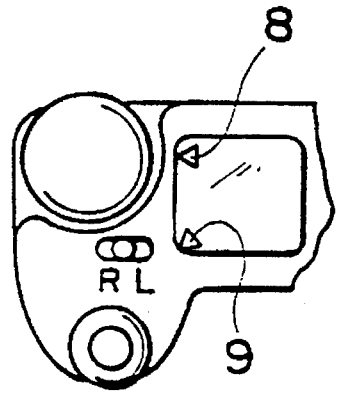

When the lock switch member 26 is thus slid to its leftward position "L", the setting state for validity and invalidity for the first and second input dials 2 and 4 is changed over to a new mode cyclically, according to the number of times the lock switch member 26 is slid to its leftward position "L", in the following order (as the first embodiment): the first dial invalid mode, the second dial invalid mode, the both dials invalid mode, and the both dials valid mode. However, when the lock switch member 26 is slid to its rightward position "R", as will be explained hereinafter, this operates so as forcibly to select the both dials valid mode. In the both dials valid mode, as shown in FIG. 6A, neither the indication 8 nor the indication 9 is displayed on the display device 5. In the first dial invalid mode, as shown in FIG. 6B, the indication 8 is displayed, while the indication 9 is not displayed. In the second dial invalid mode, as shown in FIG. 6C, the indication 8 is not displayed while the indication 9 is displayed. And in the both dials invalid mode, as shown in FIG. 6D, both the indication 8 and the indication 9 are displayed. In FIGS. 6A through 6D, indications other than the indications 8 and 9 which may be displayed on the display device 5 are not illustrated; actually it is desirable for the currently set states of various control information items for the camera such as shutter speed or aperture value or the like to be displayed on the display device 5.

FIG. 7 is a block diagram of a control system incorporated in this camera, particularly showing portions thereof related to the switchover control of the input dials 2 and 4 between validity and invalidity for setting control information. Referring to this figure, the reference numeral 30 denotes a CPU (central processing unit), comprising a microcomputer and various associated circuitry essential to the operation thereof, which controls the operation of various parts of the camera. To this CPU 30 there are connected, as in the first embodiment described above, a lock switch 11, a first counter 12, a second counter 13, a display drive section 14, a counter 15, and various photographic control devices which are not shown; and, further, a lock release switch 31 is also connected to the microcomputer 30. When the lock switch member 26 of FIG. 6A is shifted to its leftward position "L", the lock switch 11 is turned ON, while, when the lock switch member 26 is shifted to its rightward position "R", the lock release switch 31 is turned ON. And, when the lock switch member 26 is in its central position between its leftward position "L" and its rightward position "R", both the lock switch 11 and the lock release switch 31 are turned OFF. Further, various photographic control devices which are not shown are connected to the CPU 30 and are actuated thereby according to the number of pulses counted by the first counter 12 and the second counter 13, whereby the setting states of various corresponding parameters related to photography are controlled and altered.

Figure 8A:
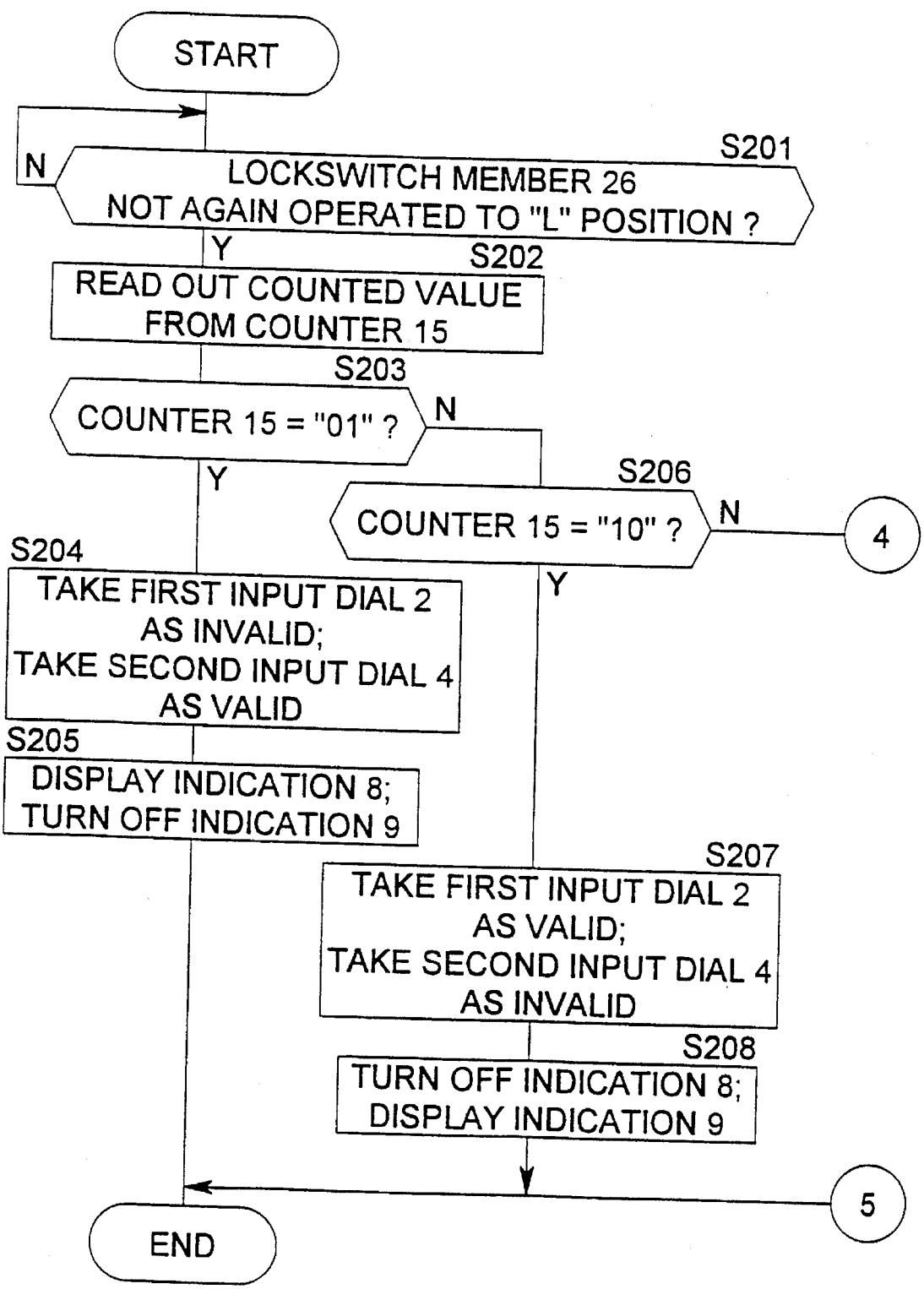
FIG. 8A and FIG. 8B are flow charts showing the operation of a control program executed by a CPU shown in FIG. 7 for switching over information setting operation members between the valid state and the invalid state, according to this second embodiment.
Figure 8B:
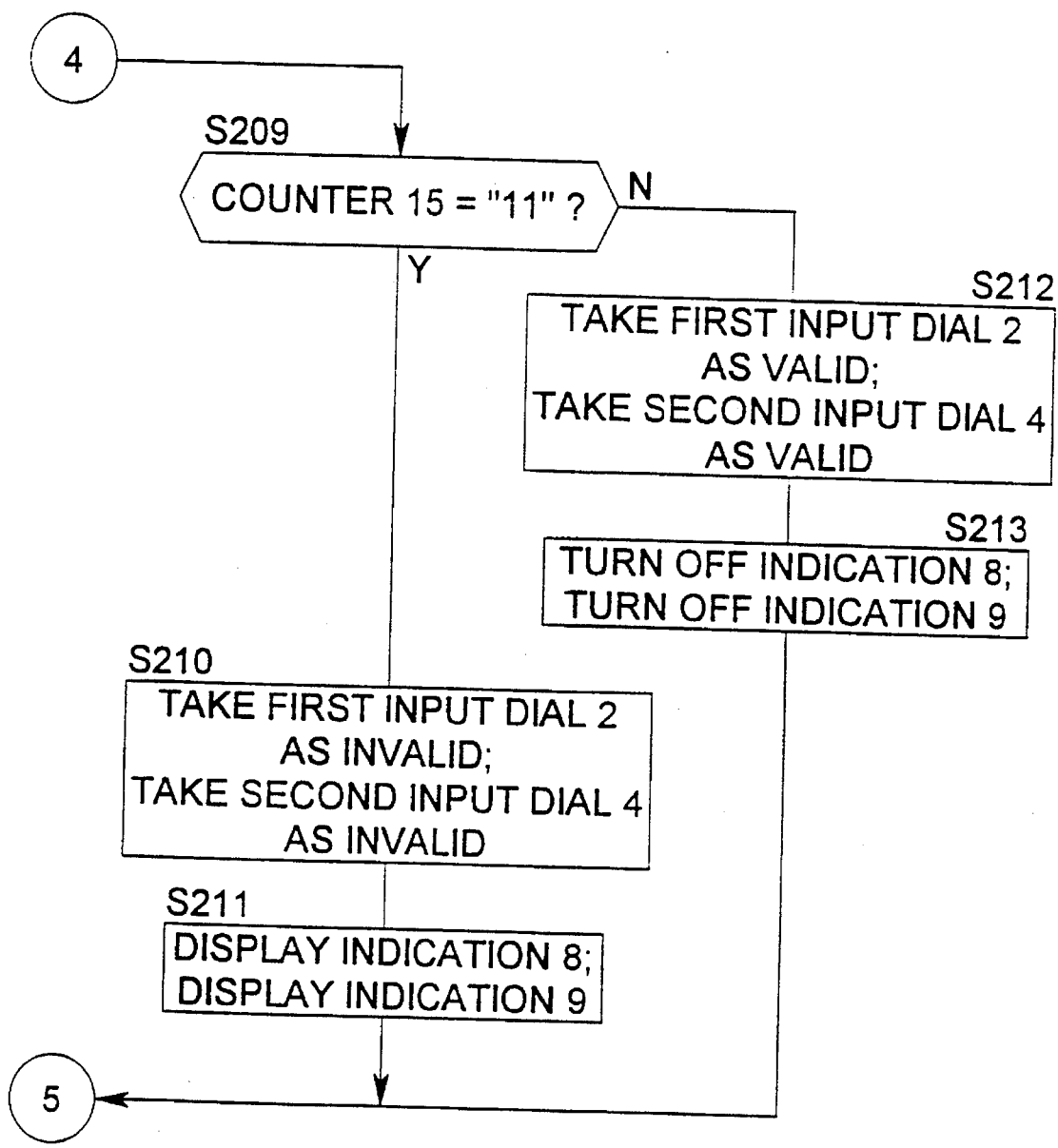

FIGS. 8A and 8B are flow charts showing the operation of a control program executed by the CPU 30 for switching over the first input dial 2 and the second input dial 4 between the valid state and the invalid state for inputting control information. When the lock switch 11 is turned ON by the lock switch member 26 being shifted to its leftward position "L", an interrupt is generated which causes the operation of the CPU 30 in performing some other process to be temporarily suspended at this time point, and the CPU 30 instead starts to execute the interrupt service routine whose flow charts are shown in FIGS. 8A and 8B.

First, in the step S201, a decision is made as to whether or not the lock switch member 26 has been shifted to its leftward position "L" again, according to whether or not a second ON signal has arrived from the lock switch 11 within a fixed time period. If the lock switch member 26 has not been shifted to its leftward position "L" again, the flow of control proceeds to the step S202. If the lock switch member 26 has been shifted to its leftward position "L" again, the flow of control loops back to this step S201 again to repeat this decision. Moreover, while this repeated decision process is taking place, the value in the counter 15 is incremented every time that the lock switch member 26 is shifted to its leftward position "L".

In the step S202 the value in the counter 15 is read out. In the step S203 a decision is made as to whether or not the value in the counter 15 is "01", and if the result is YES then this means that the first dial invalid mode is being ordered, and the flow of control is transferred to the step S204. In this step S204, the first input dial 2 is hereafter treated as invalid, while the second input dial 4 is hereafter treated as valid. After this, the flow of control passes to the step S205, in which the indication 8 on the display device 5 is displayed while the indication 9 is not displayed, as shown in FIG. 6B. And then the execution of this interrupt service routine terminates.

If on the other hand in the step S203 the result of the decision is that the value in the counter 15 is not "01", then the flow of control is transferred to the step S206. In this step S206 a decision is made as to whether or not the value in the counter 15 is "10", and if the result is YES then this means that the second dial invalid mode is being ordered, and the flow of control is transferred to the step S207. In this step S207, the first input dial 2 is hereafter treated as valid, while the second input dial 4 is hereafter treated as invalid. After this, the flow of control passes to the step S208, in which the indication 8 on the display device 5 is not displayed while the indication 9 is displayed, as shown in FIG. 6C. And then the execution of this interrupt service routine terminates.

If on the other hand in the step S206 the result of the decision is that the value in the counter 15 is not "10", then the flow of control is transferred to the step S209. In this step S209 a decision is made as to whether or not the value in the counter 15 is "11", and if the result is YES then this means that the both dials invalid mode is being ordered, and the flow of control is transferred to the step S210. In this step S210, both the first input dial 2 and also the second input dial 4 are hereafter treated as invalid. After this, the flow of control passes to the step S211, in which both the indication 8 and also the indication 9 on the display device 5 are displayed, as shown in FIG. 6D. And then the execution of this interrupt service routine terminates.

If on the other hand in the step S209 the result of the decision is that the value in the counter 15 is not "11", then this means that the both dials valid mode is being ordered, and the flow of control is transferred to the step S212. In this step S212, both the first input dial 2 and also the second input dial 4 are hereafter treated as valid. After this, the flow of control passes to the step S213, in which both the indication 8 and also the indication 9 on the display device 5 are not displayed, as shown in FIG. 6A. And then the execution of this interrupt service routine terminates.

Figure 9:
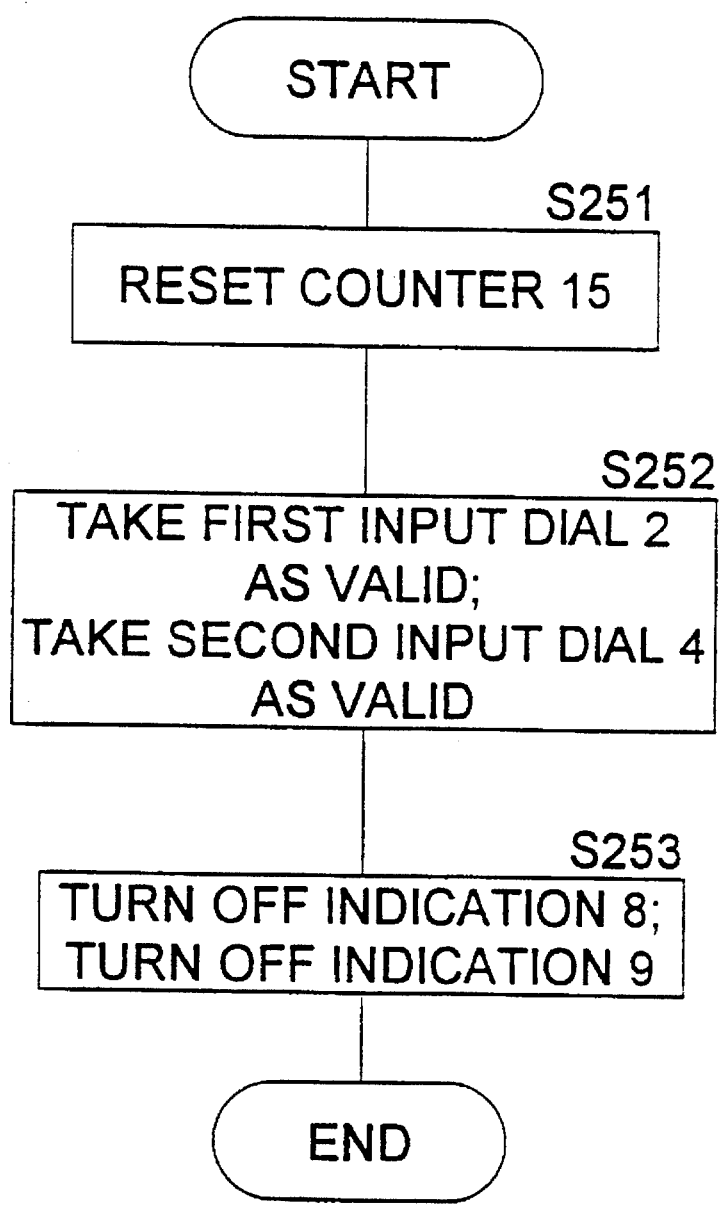
FIG. 9 is a flow chart showing the operation of a control program executed by the CPU shown in FIG. 7 for forcibly switching over to an all dials valid mode, according to this second embodiment.

FIG. 9 is a flow chart showing the operation of another control program executed by the CPU 30 for forcibly switching over both the first input dial 2 and the second input dial 4 to the valid state for inputting control information. When the lock release switch 31 is turned ON by the lock switch member 26 being shifted to its rightward position "R", another interrupt is generated, which causes the operation of the CPU 30 in performing some other process to be temporarily suspended at this time point, and the CPU 30 instead starts to execute the interrupt service routine whose flow chart is shown in FIG. 9.

In this interrupt service routine, first in the step S251 the value in the counter 15 is reset to "00", and next in the step S252 both the first input dial 2 and also the second input dial 4 are hereafter treated as valid. After this, the flow of control passes to the step S253, in which both the indication 8 and also the indication 9 on the display device 5 are not displayed, as shown in FIG. 6A. And then the execution of this interrupt service routine terminates.

As will be clear from the above explanation, with the shown second embodiment of the present invention as described above, when the lock switch member 26 is operated by being shifted to its leftward position "L" once or several times, according to the process whose flow charts are shown in FIGS. 8A and 8B, the setting state for validity and invalidity for the first and second input dials 2 and 4 is changed over to a new mode (according to the counted value on the counter 15) cyclically in the following order: the first dial invalid mode, the second dial invalid mode, the both dials invalid mode, and the both dials valid mode. Accordingly, by the use of a single lock switch member 26, it is possible to switch over the setting states for validity and invalidity for both the first and second input dials 2 and 4 as desired. Therefore, since it is not necessary to provide two separate lock switch members for the two input dials 2 and 4, the compactness of design of the camera is enhanced.

If the lock switch member 26 is shifted to its rightward position "R", the both dials valid mode is forcibly selected by the operation shown in FIG. 9. Because of this feature, the camera user is always able to perform changeover to the both dials valid mode very easily and quickly, and there is no substantial risk that the photographer will be confused even when it is necessary to change over to the both dials valid mode immediately. Referring to the terms of the claims, in this second embodiment of the present invention, the lock switch member 26 serves both as a switchover operation member and as a common control member.

An alternative possibility, as a variant of this second embodiment, would be for the lock switch member 26 to be slidable only in a single direction, either just part way to an intermediate position or all the way to a final position. With this arrangement, it is desirable (but not essential) for the amount of force required to shift the lock switch member all the way to its final position to be greater than the amount of force required to shift the lock switch member just part way to its intermediate position; this enables the camera user easily to discriminate between these two control actions. With this variant embodiment, sliding the lock switch member to its final position causes the both dials valid mode to be forcibly selected, while each time the lock switch member is slid from its neutral position to its intermediate position the setting state for validity and invalidity for the first and second input dials is changed over to a new mode cyclically in the following order: the first dial invalid mode, the second dial invalid mode, and the both dials invalid mode.

Third Embodiment

The third embodiment of the present invention will now be explained with reference to FIGS. 10 through 12. In the interests of brevity, portions of this third embodiment which are the same as portions of the first and second embodiments described above will be referred to by the same reference numerals, and will not be particularly explained.

As shown in FIGS. 10A through 10D, in this third embodiment a lock button 6, which is operated by being depressed, is provided on the upper surface of the camera, just as in the first embodiment described above. Further, by the coordinated operation of the lock button 6 and the first input dial 2 or the second input dial 4, the first input dial 2 or the second input dial 4 can be switched between the valid state for setting control information and the invalid state. In this third embodiment, the display device 5, when the power is on, always displays an indication 38 specifying the currently set shutter speed and another indication 39 specifying the currently set aperture value. When the first input dial 2 is invalid for setting the control information, an invalid indication 40 in line format is displayed over the indication 38, as shown in FIGS. 10B and 10D. And, when the second input dial 4 is invalid for setting the control information, an invalid indication 41 in line format is displayed over the indication 39, as shown in FIGS. 10C and 10D.

Figure 11:
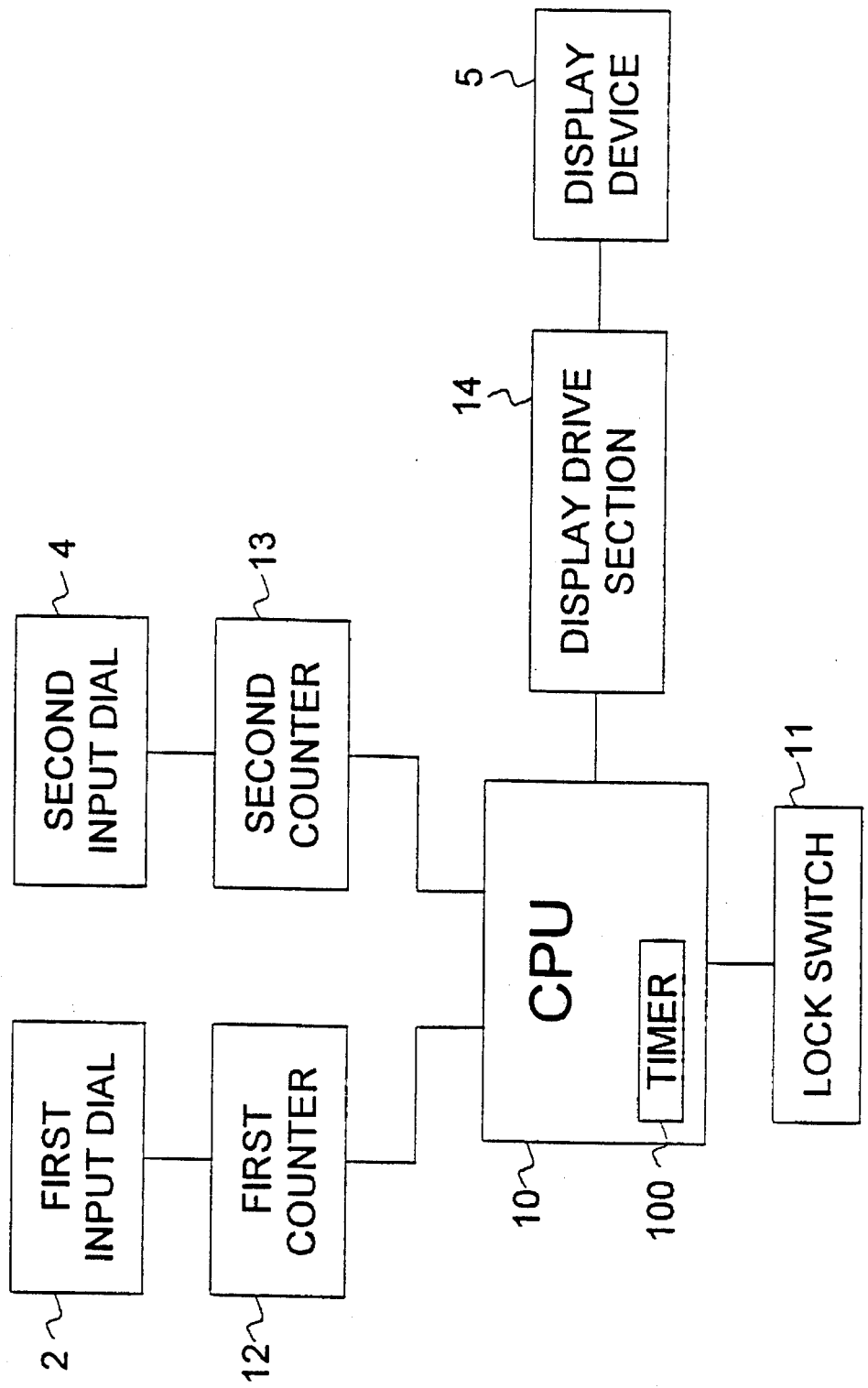
FIG. 11 is a block diagram of a control system of this camera.

FIG. 11 is a block diagram of a control system incorporated in this camera, particularly showing portions thereof related to the switchover control of the input dials 2 and 4 between validity and invalidity for setting control information. By contrast with the first embodiment described above, in this third embodiment the counter 15 which counts the number of times that the lock switch 11 is turned ON is omitted. Apart from this, the construction is the same as that shown in FIG. 3 for the first embodiment. However, the control method for switching over the input dials 2 and 4 between validity and invalidity for setting control information is different from the first embodiment.

Figure 12A:
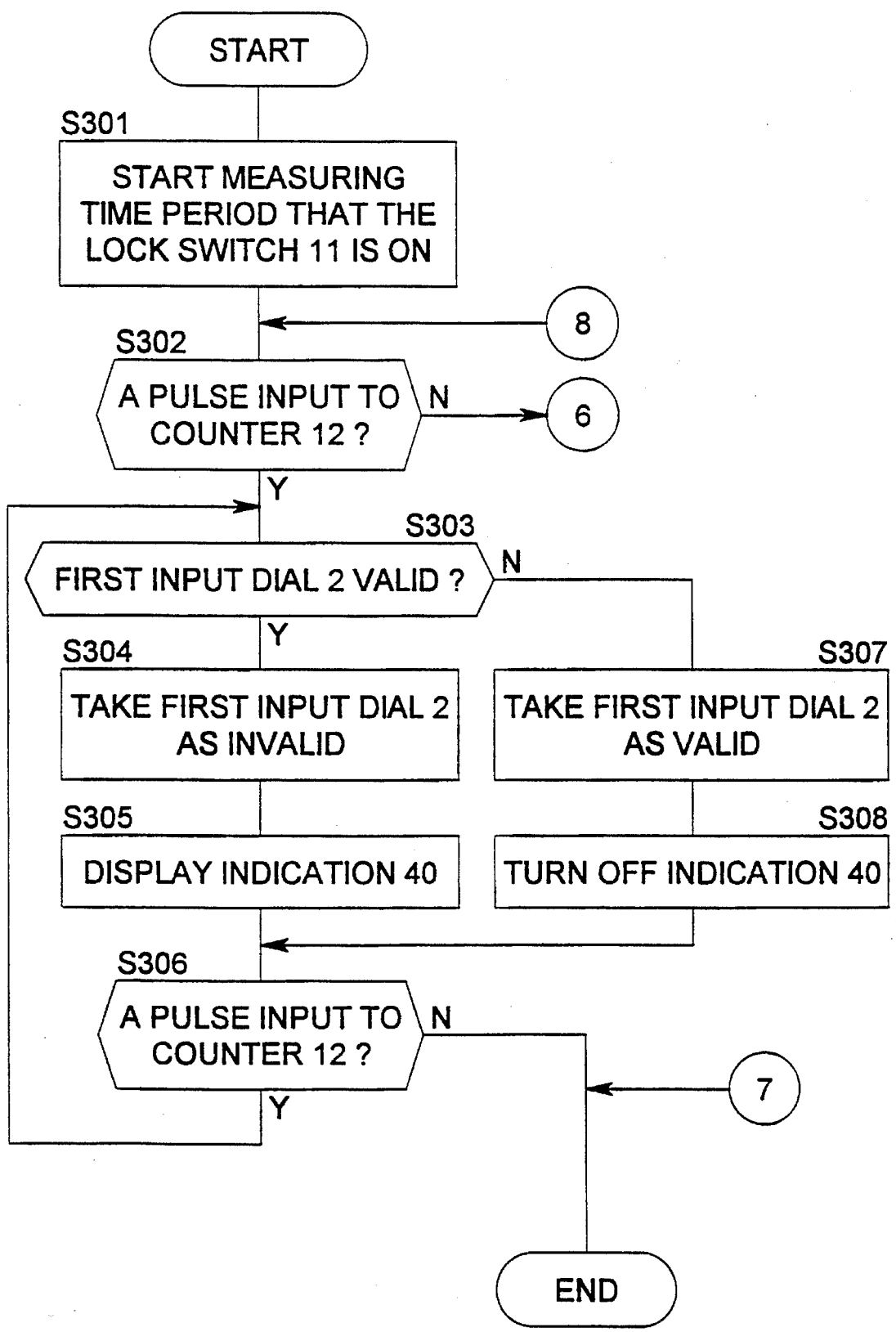
FIG. 12A and FIG. 12B are flow charts showing the operation of a control program executed by a CPU shown in FIG. 11 for switching over information setting operation members between the valid state and the invalid state, according to this third embodiment.
Figure 12B:
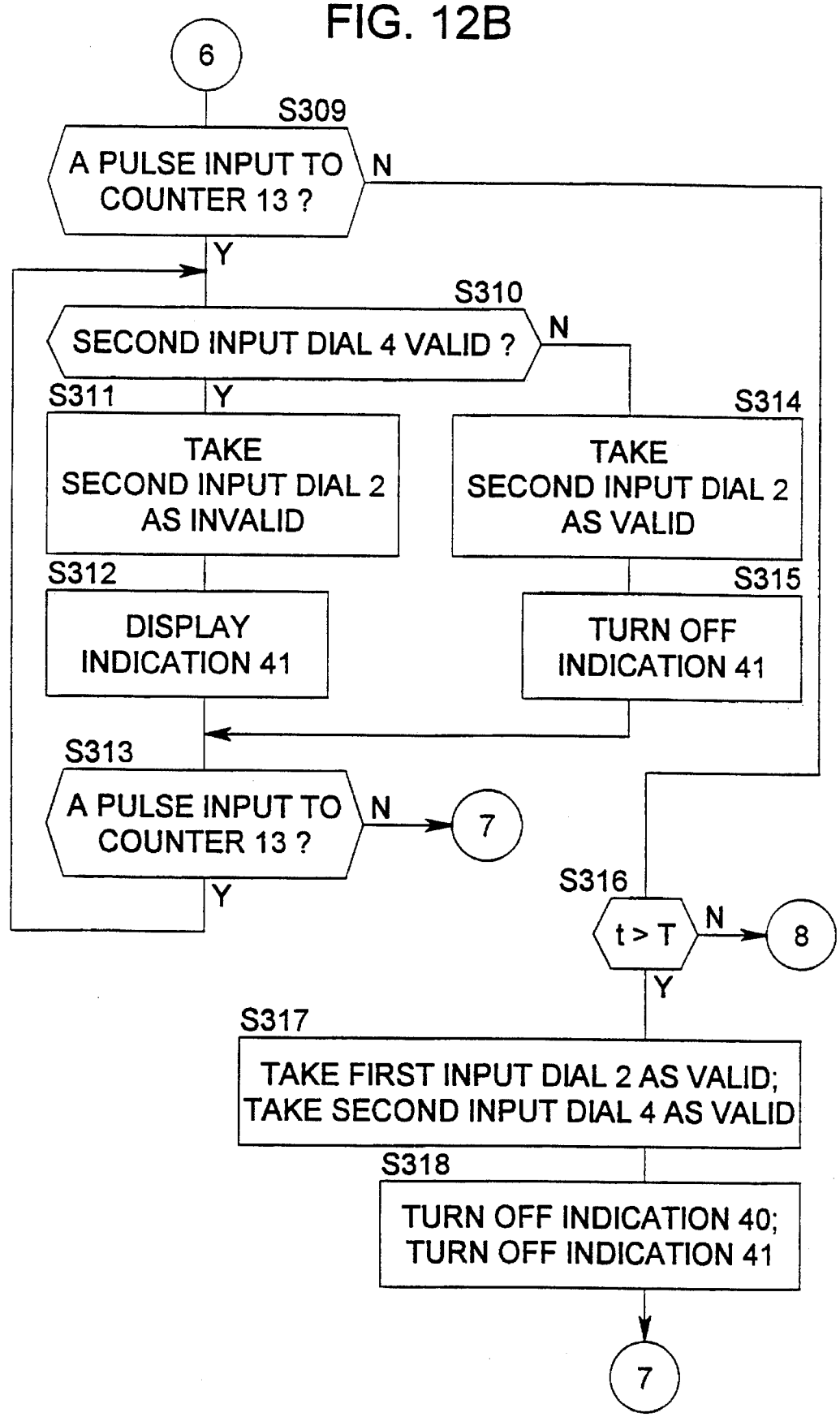
Figure 13:
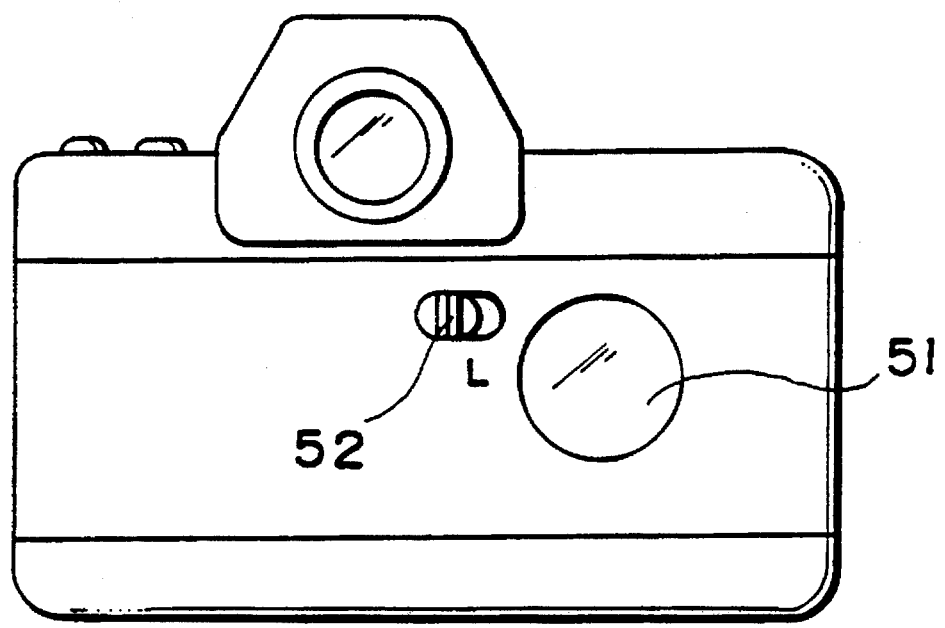
FIG. 13 is a rear view of a prior art camera, showing an input dial incorporated therein and an operation inhibition switch for this input dial.

FIGS. 12A and 12B are flow charts showing the operation of a control program executed by the CPU 10 for switching over the first input dial 2 and the second input dial 4 between the valid state and the invalid state for setting control information. When the lock switch 11 is turned ON by the lock button 6 being depressed, an interrupt is generated which causes the operation of the CPU 10 in performing some other process to be temporarily suspended at this time point, and the CPU 10 instead starts to execute the interrupt service routine whose flow charts are shown in FIGS. 12A and 12B.

First, in the step S301, the timer 100 internal to the CPU 10 is started, and measurement starts of the time period for which the lock switch 11 is ON (i.e. of the time period from when the lock switch 11 is first turned ON until the lock switch 11 is turned OFF by the lock button 6 being released). In the next step S302 a decision is made as to whether or not a pulse from the first input dial 2 has been input to the counter 12. If such pulse input has occurred, the flow of control continues to the step S303, in which a decision is made as to whether or not the first input dial 2 is currently valid for setting control information (i.e., shutter speed). If currently the first input dial 2 is valid, the flow of control passes to the step S304, in which a setting is performed so as to treat the first input dial 2 hereafter as invalid. After this, the flow of control passes to the step S305, in which the invalid indication 40 on the display device 5 is displayed, as shown in FIGS. 10B and 10D.

If in the step S303 it is decided that currently the first input dial 2 is invalid for setting control information, the flow of control passes to the step S307, in which a setting is performed so as to treat the first input dial 2 hereafter as valid. After this, the flow of control passes to the step S308, in which the invalid indication 40 on the display device 5 is turned off, as shown in FIGS. 10A and 10C. After the steps S305 or S308, the flow of control passes to the step S306, in which a decision is made as to whether or not another pulse from the first input dial 2 has been input to the counter 12, after the pulse which caused the YES decision in the step S302. If such further pulse input has occurred, the flow of control returns to the step S303, while if no further pulse input has occurred the execution of this interrupt service routine terminates.

If in the step S302 it is decided that no pulse from the first input dial 2 has been input to the counter 12, then the flow of control is transferred to the step S309 (shown in the FIG. 12B). In this step S309, a decision is made as to whether or not a pulse from the second input dial 4 has been input to the counter 13. If such pulse input has occurred, the flow of control continues to the step S310, in which a decision is made as to whether or not the second input dial 4 is currently valid for setting control information (i.e., aperture value). If currently the second input dial 4 is valid, the flow of control passes to the step S311, in which a setting is performed so as to treat the second input dial 4 hereafter as invalid. After this, the flow of control passes to the step S312, in which the invalid indication 41 on the display device 5 is displayed, as shown in FIGS. 10C and 10D.

If in the step S310 it is decided that currently the second input dial 4 is invalid for setting control information, the flow of control passes to the step S314, in which a setting is performed so as to treat the second input dial 4 hereafter as valid. After this, the flow of control passes to the step S315, in which the invalid indication 41 on the display device 5 is turned off, as shown in FIGS. 10A and 10B. After the steps S312 or S315, the flow of control passes to the step S313, in which a decision is made as to whether or not another pulse from the second input dial 4 has been input to the counter 13, after the pulse which caused the YES decision in the step S309. If such further pulse input has occurred, the flow of control returns to the step S310, while if no further pulse input has occurred the execution of this interrupt service routine terminates.

If the result of the decision in the step S309 is that, also, no pulse from the second input dial 4 has been input to the counter 13, then the flow of control is transferred to the step S316. In this step S316, a decision is made as to whether or not the time during which the lock switch 11 has been kept in the ON state by depression of the lock button 6, as timed by the timer 100, has yet exceeded a predetermined value T, which may for example be 2 or 3 seconds. If this limit time period T has not yet been reached, the flow of control returns to the step S302 of the FIG. 12A flow chart, and continues to loop around through the steps S302, S309, and S316 until the result of one of these decision steps becomes YES. However, when the time period during which the lock switch 11 has been ON comes to exceed the limit time period T, the flow of control is transferred to the step S317, in which settings are performed so as to treat both the first input dial 2 and the second input dial 4 hereafter as valid. After this, the flow of control passes to the step S318, in which both the invalid indication 40 and also the invalid indication 41 on the display device 5 are turned off, as shown in FIG. 10A. And then the execution of this interrupt service routine terminates. Moreover, even during the processing performed in the steps S301 through S318 of these flow charts, the turning ON and OFF of the lock switch 11 is looked out for, and if the lock switch 11 is turned OFF processing is terminated at that time point.

According to the processing described above, by the process shown in the steps S303 through S306, when the first input dial 2 is rotated while the lock button 6 is held down, the validity setting for the first input dial 2 is reversed, i.e. is toggled, each time the input dial 2 is rotated through an angular distance which corresponds to one pulse being sent therefrom to the counter 12. Further, when the second input dial 4 is rotated while the lock button 6 is held down, the validity setting for the second input dial 4 is reversed, i.e. is toggled, each time the input dial 4 is rotated through an angular distance which corresponds to one pulse being sent therefrom to the counter 13. The angular direction in which the input dials 2 and 4 are rotated does not affect this alternating change of their validity settings.

In this manner, in this third embodiment, by the coordinated operation of the lock button 6 and the input dials 2 and 4, the validity and invalidity settings of the input dials 2 and 4 can be altered independently, so that any desired combination of can be set. This is not done, as was the case in the first and the second embodiments of the present invention described above, by the settings of the input dials 2 and 4 both being changed by a single type of manipulation of a control element, so that the various combinations of validity and invalidity are cycled through in a fixed order. Rather, when it is desired to alter the validity setting for any particular input dial, that setting can be toggled to its opposite by a particular manipulation, without disturbing the validity setting for any other input dial. Because the single lock button 6 is used (in combination with the input dials 2 and 4 themselves) for altering the validity settings for both of the input dials 2 and 4, thereby the number of control elements is reduced, by contrast with the prior art in which an individual lock switch was required to be provided for each input knob. The feature that the both dials valid mode is forcibly selected, if simply the single lock button 6 is continuously depressed for longer than the predetermined time period T, is the same as in the case of the first embodiment described above. Referring to the terms of the claims, in this third embodiment, the lock button 6 and the input dials 2 and 4 serve as switchover operation members, while the lock button 6 serves as a common control member.

The present invention is not to be considered as being limited to the case in which only two information setting operation members (like the input dials 2 and 4) are provided; the principles of the present invention could profitably be applied to the case where three or more such information setting operation members are utilized. In such a case, it is not necessary to make it possible to select all of the theoretically possible combinations of validity and invalidity for each of the various information setting operation members, and it will be acceptable to extract and make available for selection those combinations of validity and invalidity whose frequency of use is high.

Although in the shown first and second embodiments of the present invention disclosed above the combinations of validity and invalidity for the two input dials 2 and 4 were selected in a cyclic manner according to the number of times in which the lock button 6 or the lock switch member 26 was pressed or shifted, as a variant it would be possible for the lock button 6 to be constituted as a dial, and in this case the combination of validity and invalidity would be changed each time this dial was rotated through a predetermined angular amount. Other variations of the details of the present invention are possible, without departing from its scope. Accordingly, although the present invention has been shown and described in terms of several preferred embodiments thereof, it is not to be considered as limited by any of the perhaps quite fortuitous details of the embodiments or of the drawings, but only by the terms of the appended claims, which follow.

We claim:

1. An information setting device for a camera, comprising:

information setting operation members which are operated for setting control information;

an information setting means which sets said control information according to the operation of said information setting operation members;

a switchover operation member group which is operated for switching each of control information setting functions of said information setting operation members between a valid state and an invalid state respectively; and, a switchover control means which switches over each of said control information setting functions between said valid state and said invalid state respectively according to the operation of said switchover operation member group; wherein, said switchover operation member group comprises a common operation member which is operated in common for switching over any one of said control information setting functions between said valid state and said invalid state.

2. An information setting device for a camera according to claim 1; wherein, said switchover operation member group consists only of said common operation member; and, said switchover control means selects one of predetermined combinations of said valid state and said invalid state for each of said information setting operation members for switching over said control information setting functions according to the amount of operation of said common operation member.

3. An information setting device for a camera according to claim 2; wherein, p1 said switchover control means selects said one of said predetermined combinations in a fixed order according to the amount of operation of said common operation member.

4. An information setting device for a camera according to claim 2; wherein, said predetermined combinations include an all invalid combination in which all of said control information setting functions are switched over to said invalid state.

5. An information setting device for a camera according to claim 2; wherein, said predetermined combinations include an all valid combination in which all of said control information setting functions are switched over to said valid state.

6. An information setting device for a camera according to claim 5; wherein said switchover control means selects said one of said predetermined combinations according to the amount of operation of said common operation member by operation of said common operation member continuously for a time period less than a predetermined time period, and said switchover control means selects said all valid combination by operation of said common operation member continuously for a period of time greater said predetermined time period.

7. An information setting device for a camera according to claim 5; wherein, said common operation member can be operated in a first direction and a second direction which differs from said first direction; and, when said common operation member is operated in said first direction, said switchover control means selects said one of said predetermined combinations according to the amount of operation of said common operation member, and when said common operation member is operated in said second direction, said switchover control means selects said all valid combination.

8. An information setting device for a camera according to claim 1; wherein, said switchover operation member group comprises said common operation member and said information setting operation members; and, said switchover control means switches over one of said control information setting functions which corresponds to said one of said information setting operation members between said valid state and said invalid state by a coordinated operation of said common operation member and one of said information setting operation members.

9. An information setting device for a camera according to claim 8; wherein, said switchover control means switches over said one of said control information setting functions alternatingly between said valid state and said invalid state, each time said one of said information setting operation members is operated a predetermined unit amount in coordination with the operation of said common operation member.

10. An information setting device for a camera according to claim 8; wherein, said common operation member and said one of said information setting operation members are operated simultaneously on said coordinated operation.

11. An information setting device for a camera according to claim 1; further comprising a display means which displays information for specifying whether each of said control information functions is in said valid state or in said invalid state.

12. An information setting device for a camera, comprising:

information setting operation members which are operated for setting control information;

an information setting means which sets said control information according to the operation of said information setting operation members;

a single common operation member which is operated for switching each of control information setting functions of said information setting operation members between a valid state and an invalid state respectively; and a switchover control means which selects one of predetermined combinations of said valid state and said invalid state for each of said information setting operation members for switching over said control information functions according to the operation of said single common operation member.

13. An information setting device for a camera according to claim 12; wherein, said switchover control means selects each one of said predetermined combinations according to the amount of operation of said common operation member.

14. An information setting device for a camera according to claim 13; wherein, said switchover control means selects said one of said predetermined combinations in a fixed order according to the amount of operation of said common operation member.

15. An information setting device for a camera according to claim 13; wherein, said predetermined combinations include an all invalid combination in which all of said control information setting functions are switched over to said invalid state.

16. An information setting device for a camera according to claim 13; wherein, said predetermined combinations include an all valid combination in which all of said control information setting functions are switched over to said valid state.

17. An information setting device for a camera according to claim 16; wherein, said switchover control means selects said one of said predetermined combinations according to the amount of operation of said common operation member by operation of said common operation member continuously for a time period less than a predetermined time period, and said switchover control means selects said all valid combination.

18. An information setting device for a camera according to claim 17; wherein, said common operation member can be operated in a first direction and a second direction which differs from said first direction; and, said switchover control means selects said one of said predetermined combinations according to the amount of operation of said common operation member in said first direction, and said switchover control means selects said all valid combination by operation of said common operation member in said second direction.

19. An information setting device for a camera according to claim 12; further comprising a display means which displays information for specifying whether each of said control information setting functions is in said valid state or in said invalid state.

20. An information setting device for a camera, comprising:

information setting operation members which are operated for setting control information;

an information setting means which sets said control information according to the operation of said information setting operation members;

a single common operation member which is operated for switching each of control information setting functions of said information setting operation members between a valid state and an invalid state respectively; and a switchover control means which switches over each one of said control information setting functions between said valid state and said invalid state respectively according to coordinated operation of said common operation member and each one of said information setting operation members.

21. An information setting device for a camera according to claim 20; wherein, operation of said switchover control means in conjunction with operation of said common operation member switches one of said control information setting functions for one of said information setting operation members between said valid state and said invalid state.

22. An information setting device for a camera according to claim 20; wherein, said common operation member and each one of said information setting operation members are operated simultaneously in said coordinated operation.

23. An information setting device for a camera according to claim 20; further comprising a display means which displays information for specifying whether each of said control information setting functions is in said valid state or in said invalid state.

24. An information setting device for a camera, comprising:

information setting operation members which are operated for setting control information;

an information setting device which sets said control information according to the operation of said information setting operation members;

a switchover operation member group which is operated for switching each of control information setting functions of said information setting operation members between a valid state and an invalid state respectively; and, a switchover control device which switches over each of said control information setting functions between said valid state and said invalid state respectively according to the operation of said switchover operation member group; wherein, said switchover operation member group comprises a common operation member which is operated in common for switching over any one of said control information setting functions between said valid state and said invalid state.

25. An information setting device for a camera according to claim 24; wherein, said switchover operation member group consists only of said common operation member; and, said switchover control device comprises an operation amount detection circuit which detects the amount of operation of said common operation member, and selects one of predetermined combinations of said valid state and said invalid state for each of said information setting operation members for switching over said control information setting functions according to the amount of operation of said common operation member as detected by said operation amount detection circuit.

26. An information setting device for a camera according to claim 25; wherein, each switchover control device selects said one of said predetermined combinations in a fixed order in turn according to the amount of operation of said common operation member.

27. An information setting device for a camera according to claim 25; wherein, said predetermined combinations include an all invalid combination in which all of said control information setting functions are switched over to said invalid state.

28. An information setting device for a camera according to claim 25; wherein, said predetermined combinations include an all valid combination in which all of said control information setting functions are switched over to said valid state.

29. An information setting device for a camera according to claim 28; wherein, said switchover control device comprises an operation time period detection circuit which detects the time period over which said common operation member is operated continuously, and, when said time period of continuous operation of said common operation member is less than a predetermined time period, said switchover control device selects said one of said predetermined combinations according to the amount of operation of said common operation member; and when said time period of continuous operation of said common operation member is greater than said predetermined time period, said switchover control device selects said all valid combination.

30. An information setting device for a camera according to claim 28; wherein, said common operation member can be operated in a first direction and in a second direction which differs from said first direction; and, said switchover control device comprises a direction determination circuit which determines the direction in which said common operation member is operated, and, when said common operation member is detected by said direction determination circuit as operating in said first direction, said switchover control device selects said one of said predetermined combinations according to the amount of operation of said common operation member; and when said common operation member is detected by said direction determination circuit as operating in said second direction, said switchover control device selects said all valid combination.

31. An information setting device for a camera according to claim 24; wherein, said switchover operation member group comprises said common operation member and said information setting operation members; and, when a coordinated operation of said common operation member and one of said information setting operation members is performed, said switchover control device switches over one of said control information setting functions which corresponds to said one of said information setting operation members between said valid state and said invalid state.

32. An information setting device for a camera according to claim 31; wherein, operation of said switchover control device in conjunction with operation of said one of said information setting members switches said one of said control information setting functions between said valid state and said invalid state.

33. An information setting device for a camera according to claim 31; wherein, said common operation member and said one of said information setting operation members are operated simultaneously to perform said coordinated operation.

34. An information setting device for a camera according to claim 24; further comprising a display device which displays information for specifying whether each of said control information setting functions is in said valid state or in said invalid state.

35. An information setting device for a camera, comprising:

information setting operation members which are operated for setting control information;

an information setting device which sets said control information according to the operation of said information setting operation members;

a single common operation member which is operated for switching each of control information setting functions of said information setting operation members between a valid state and an invalid state respectively; and a switchover control device which selects one of predetermined combinations of said valid state and said invalid state for each of said information setting operation members for switching over said control information setting functions according to the operation of said single common operation member.

36. An information setting device for a camera according to claim 35; wherein, said switchover control device comprises an operation amount detection circuit which detects the amount of operation of said common operation member, and selects said one of said predetermined combinations according to the amount of operation of said common operation member as detected by said operation amount detection circuit.

37. An information setting device for a camera according to claim 36; wherein, said switchover control device selects said one of said predetermined combinations in a fixed order according to the amount of operation of said common operation member.

38. An information setting device for a camera according to claim 37; wherein, said predetermined combinations include an all invalid combination in which all of said control information setting functions are switched over to said invalid state.

39. An information setting device for a camera according to claim 37; wherein, said predetermined combinations include an all valid combination in which all of said control information setting functions are switched over to said valid state.

40. An information setting device for a camera according to claim 39; wherein, said switchover control device comprises an operation time period detection circuit which detects the time period over which said common operation member is operated continuously, and, when said time period of continuous operation of said common operation member is less than a predetermined time period, said switchover control device selects said one of said predetermined combinations according to the amount of operation of said common operation member; and when said time period of continuous operation of said common operation member is greater than said predetermined time period, said switchover control device selects said all valid combination.

41. An information setting device for a camera according to claim 40; wherein, said common operation member can be operated in a first direction and in a second direction which differs from said first direction; and, said switchover control device comprises a direction determination circuit which determines the direction in which said common operation member is operated, and, when said common operation member is detected by said direction determination circuit as operating in said first direction, said switchover control device selects said one of said predetermined combinations according to the amount of operation of said common operation member; and when said common operation member is detected by said direction determination circuit as operating in said second direction, said switchover control device selects said all valid combination.

42. An information setting device for a camera according to claim 35; further comprising a display device which displays information for specifying whether each of said control information setting functions is in said valid state or in said invalid state.

43. An information setting device for a camera, comprising:

information setting operation members which are operated for setting control information;

an information setting device which sets said control information according to the operation of said information setting operation members;

a single common operation member which is operated for switching each of said control information setting functions of said information setting operation members between a valid state and an invalid state respectively; and a switchover control device which switches over the each one of said control information functions between said valid state and invalid state respectively according to coordinated operation of said common operation member and each one of said information setting operation members.

44. An information setting device for a camera according to claim 43; wherein, operation of said switchover control device in conjunction with operation of said one of said information setting members switches one of said control information setting functions for one of said information setting operation members between said valid state and said invalid state.

45. An information setting device for a camera according to claim 43; wherein, said common operation member and each one of said information setting operation members are operated simultaneously to perform said coordinated operation.

46. An information setting device for a camera according to claim 43; further comprising a display device which displays information for specifying whether each of said control information setting functions is in said valid state or in said invalid state.

* * * * *